(12) United States Patent
Ling

(10) Patent No.: US 9,395,188 B2
(45) Date of Patent: Jul. 19, 2016

(54) METHOD AND SYSTEM FOR LOCATION DETERMINATION AND NAVIGATION USING STRUCTURAL VISUAL INFORMATION

(75) Inventor: Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 448 days.

(21) Appl. No.: 13/309,081

(22) Filed: Dec. 1, 2011

(65) Prior Publication Data
US 2013/0141565 A1 Jun. 6, 2013

(51) Int. Cl.
| | |
|---|---|
| *G01C 21/16* | (2006.01) |
| *H04N 7/18* | (2006.01) |
| *G01C 21/20* | (2006.01) |
| *G01C 21/36* | (2006.01) |

(52) U.S. Cl.
CPC ............ *G01C 21/165* (2013.01); *G01C 21/206* (2013.01); *G01C 21/3602* (2013.01); *H04N 7/18* (2013.01)

(58) Field of Classification Search
CPC ......... H04N 7/18; G06K 9/46; G06K 9/4604; G06K 9/4609; G01C 17/30; G01C 21/165; G01C 21/206; G01C 21/3602; G06T 7/00; G06T 7/0024; G06T 7/0028; G06T 7/003; G06T 7/004; G06T 7/0042
See application file for complete search history.

(56) References Cited

U.S. PATENT DOCUMENTS

| | | | | |
|---|---|---|---|---|
| 6,765,569 | B2 * | 7/2004 | Neumann et al. ............. | 345/419 |
| 7,941,133 | B2 * | 5/2011 | Aaron et al. .................. | 455/418 |
| 2005/0182518 | A1 * | 8/2005 | Karlsson ....................... | 700/253 |
| 2009/0228204 | A1 * | 9/2009 | Zavoli et al. .................. | 701/208 |
| 2010/0208057 | A1 * | 8/2010 | Meier et al. ................... | 348/135 |
| 2010/0331010 | A1 * | 12/2010 | Ische et al. ................. | 455/456.1 |
| 2011/0064312 | A1 * | 3/2011 | Janky et al. ................... | 382/195 |
| 2012/0197519 | A1 * | 8/2012 | Richardson ................... | 701/408 |
| 2012/0300020 | A1 * | 11/2012 | Arth et al. ........................ | 348/36 |
| 2013/0297198 | A1 * | 11/2013 | Vande Velde et al. ........ | 701/409 |

OTHER PUBLICATIONS

C. Arth et al., "Real-Time Self-Localization from Panoramic Images on Mobile Devices," Proc. IEEE Int'l Symp. Mixed and Augmented Reality (ISMAR 11), IEEE, Oct. 26-29, 2011, pp. 37-46.*
G. Takacs et al. (Outdoors Augmented Reality on Mobile Phone using Loxel-based Visual Feature Organization. In MIR, pp. 427-434, 2008.).*

* cited by examiner

*Primary Examiner* — Behrooz Senfi
*Assistant Examiner* — Maria Vazquez Colon
(74) *Attorney, Agent, or Firm* — McAndrews, Held & Malloy

(57) ABSTRACT

Methods and systems for location determination using structural visual information may comprise receiving global navigation satellite system (GNSS) signals in a wireless device (WD) for determining a first position of the WD. One ore more images of a structure or structures near the WD may be captured and a position may be determined based on a comparison of the structures in the images to structures in a stored database. The database may be pre-stored based on a known future location of a user of the WD. The database may be downloaded and stored when insufficient GNSS signals are present. The database may comprise a plurality of images or may comprise video of structures. A distance from the structures may be determined based on known optical properties of a camera in the WD, and may be used to determine an accurate location based on the images.

30 Claims, 12 Drawing Sheets

METHOD AND SYSTEM FOR LOCATION DETERMINATION AND NAVIGATION USING STRUCTURAL VISUAL INFORMATION

CROSS-REFERENCE TO RELATED APPLICATIONS

This application makes reference to application Ser. No. 13/328,413.

FIELD OF THE INVENTION

Certain embodiments of the invention relate to wireless device positioning. More specifically, certain embodiments of the invention relate to a method and system for location determination and navigation using structural visual information.

BACKGROUND OF THE INVENTION

Wireless communication devices with global location navigation system (GNSS) capability are becoming more prevalent. These devices depend on RF signals received from satellites for calculating position. However, these satellite signals are weak and are attenuated when inside buildings such that wireless devices can no longer obtain a lock on the signals and thus can no longer determine location.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for location determination using structural visual information, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for location determination and navigation using structural visual information. Exemplary aspects of the invention may comprise receiving global navigation satellite system (GNSS) signals in a wireless communication device for determining a first position of the wireless communication device. One or more images of a structure or structures in the vicinity of the wireless communication device may be captured and a position of the wireless communication device may be determined based on a comparison of the structure or structures in the one or more captured images to structures in a stored database of structures. An orientation of structures in the captured one or more images may be sensed relative to the wireless device. Images may be processed for feature extraction and identification of structural elements for the position determining. An orientation of the wireless device may be utilized in conjunction with the extraction and identification for the position determining. The orientation and extraction and identification may be utilized in conjunction with determined distances from one or more identified structures for the position determining. The locations of structures and/or the captured one or more images may be stored in the database of structures. GNSS signals may be received when GNSS signals sufficient for positioning are present. The database of structures may be pre-stored and may be pre-stored based on a known future location of a user of the wireless communication device. The database of structures may be downloaded and stored when GNSS signals sufficient for positioning are no longer received by the wireless communication device. The database of structures may comprise a plurality of images. The one or more images may comprise a video of structures in the vicinity of the wireless communication device. A distance from one or more of the structures in the vicinity of the wireless communication device may be determined based on known optical properties of a camera in the wireless communication device, where the optical properties may comprise focus setting and focal length, as is done with range-finding scopes and binoculars. The determined distance may be used to determine an accurate location based on the captured one or more images. The first location of the wireless device may be determined utilizing medium Earth orbit satellite signals and/or low Earth orbit satellite signals.

Figure 1:
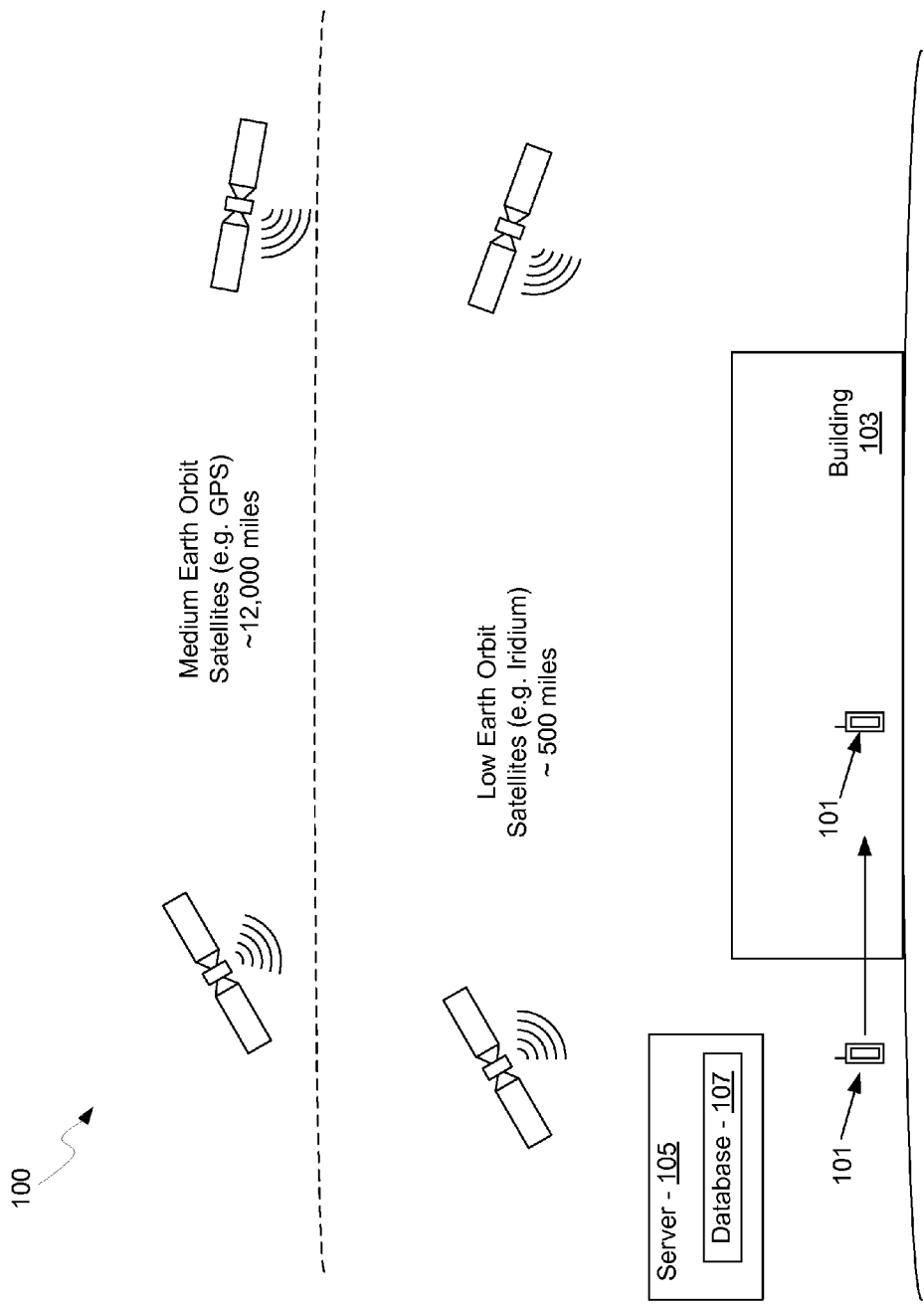
FIG. 1 is a block diagram of an exemplary wireless device with positioning capability, in accordance with an embodiment of the invention.

FIG. 1 is a diagram of an exemplary wireless device with positioning capability, in accordance with an embodiment of the invention. Referring to FIG. 1, there is shown a wireless device 101 and the server 105, which may comprise a database 107. The wireless device 101 may comprise any device (e.g. smart phone) or vehicle where its user may desire to know the location of such device or vehicle. The wireless device 101 may comprise a global navigation satellite system (GNSS) receiver that may be operable to receive medium Earth orbit (MEO) satellite signals and low Earth orbit (LEO) satellite signals.

There is also shown MEO satellites (e.g. GPS satellites), and LEO satellites (e.g. Iridium communication satellites). Medium Earth orbit satellites may be at a height of about 12,000 miles above the surface of the Earth, compared to about 500 miles above the surface for low Earth orbit satellites. Therefore, the signal strength of LEO satellite signals is much stronger than MEO satellite signals. LEO satellites may be used for telecommunication systems, such as satellite phones, whereas MEO satellite systems may be utilized for location and navigation applications.

In certain circumstances, satellite signals may be attenuated when the wireless device 101 enters a building, such that the wireless device may not be able to utilize satellite signals to determine its location. In this instance, it may be desirable to determine the location of the wireless device 101 utilizing other techniques.

In an exemplary embodiment, the wireless device 101 may determine its location via GNSS when outside the building 103. In instances where the building 103 attenuates satellite signals to such a level that the wireless device 101 can no longer obtain a lock for GNSS positioning purposes, the wireless device 101 may utilize structural features to determine its location.

Structural features may be input to the wireless device 101 via a photo, a series of photos, or video taken by a camera in the wireless device 101. These may be combined with orientation (elevation, azimuth, and rotation) of the camera captured by a compass, gyroscope, gravity sensor, or other kind of sensor present in the camera. Optical focus and/or distance sensors on the camera may estimate the distance of the structural features. The features may include corners of the buildings, storefront openings, fountains, columns, escalators, etc. The features in images, their relative position to each other and distance from the camera, obtained by the wireless device 101 may be compared to the known structure of the building in one or more database, such as the database 107, either stored locally or obtained from a remote server 105. The server may be accessed via a cellular network or the Internet via an access point, for example.

In an exemplary scenario, the wireless device 101 may download a structural map of the building 103 upon entering and losing GNSS signals; it may download the locations of features of the building; or it may use satellite information and publically-available maps to estimate the locations of structural features such as the corners of the building. These modalities are collectively referred to as structural maps.

In another exemplary scenario, the wireless device 101 may store structural maps of buildings commonly visited by the user of the device 101. In yet another exemplary scenario, the wireless device 101 may download structural maps of locations that the user of the wireless device enters or plans to enter in the future. For example, if a user has entered an address of a shopping mall or a sports arena into a navigation program, the wireless device may download one or more structural maps associated with the destination or destinations. Similarly, if a calendar for the user has an entry for a sports event at a particular sports arena, the wireless device 101 may download structural maps for that sports arena prior to the event. Or if a user has a flight scheduled, the wireless device 101 may download structural maps for the airports to be utilized on the trip.

The wireless device 101 may determine its position by using estimated orientation and (when available) distance relative to structural elements, and employing triangulation methods such as is done in orienteering using the azimuth reading (e.g. provided by a compass) of several landmarks to pinpoint one's location on a map. Where one known structural element is identified, and its orientation and distance from the wireless device 101 are accurately determined, this is sufficient to establish a probable location of the wireless device 101. Other landmarks may be used to increase the certainty and accuracy of the location of the wireless device 101. It may use more sophisticated trilateration calculations such as is done by GNSS devices, once distance to structural elements is estimated. The orientation of the captured structures with respect to the wireless device 101 may be determined based on the orientation of the wireless device 101 in space as measured using internal sensors such as a compass and MEMS accelerometers, for example.

The wireless device 101 may compare one or more captured structural elements, such as a fountain or kiosk in relation to interior corners, for example, to structures in stored or retrieved databases, and known to be in the vicinity of the wireless device when it lost GNSS lock upon entering the building 103. By comparing a captured structure to a known structure, and finding a match, or a correlation above a threshold level, the wireless device may then calculate its location based on the known map of the building 103. This is shown in further detail in FIG. 2.

Figure 2A:
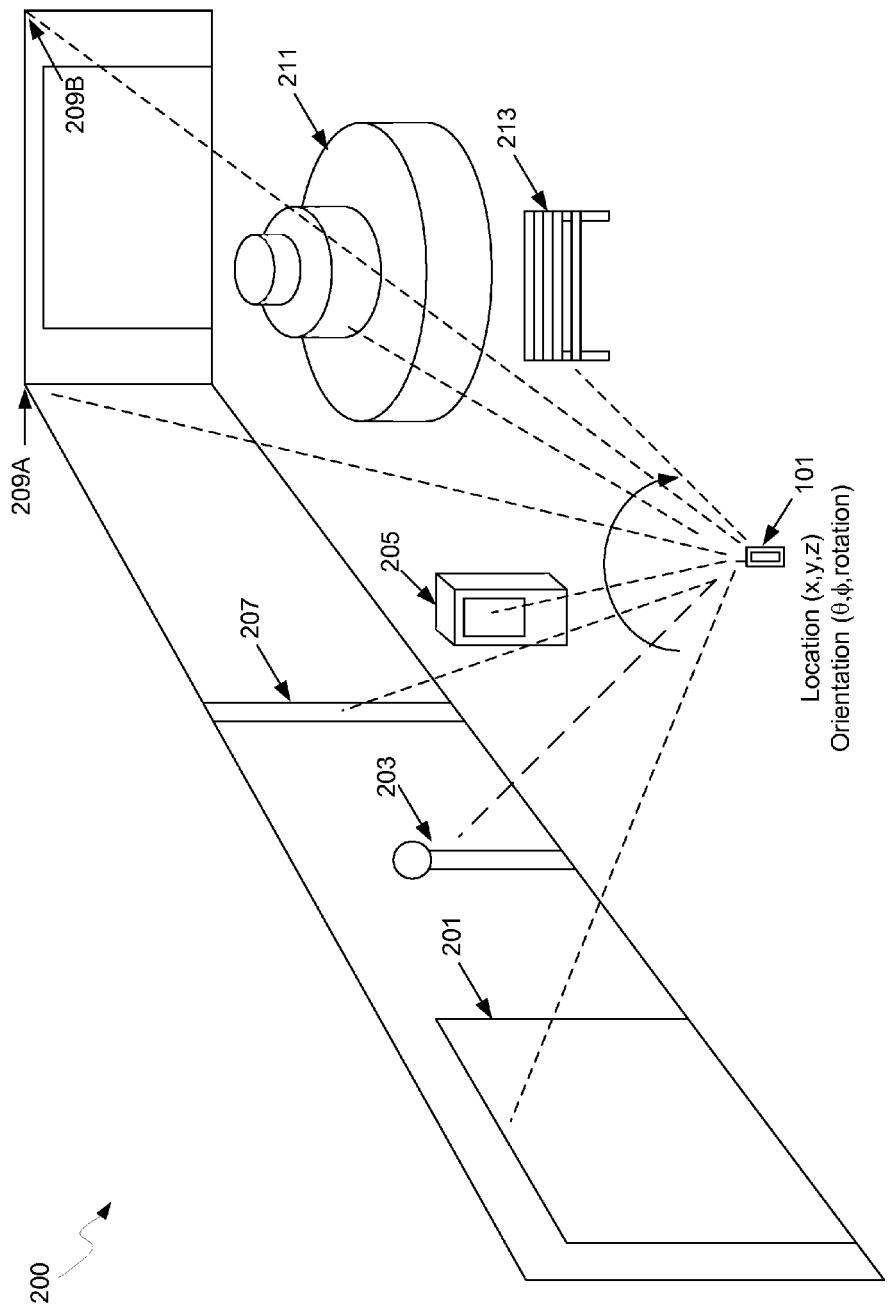
FIG. 2A is a block diagram illustrating an exemplary building with known structures, in accordance with an embodiment of the invention.

FIG. 2A is a diagram illustrating an exemplary building with known structures, in accordance with an embodiment of the invention. Referring to FIG. 2A, there is shown a shopping mall 200 comprising a store entrance 201, a lamppost 203, a kiosk 205, a support column 207, corners 209A and 209B, a fountain 211, and a bench 213. There is also shown the wireless device 101, which may be located at location (x,y,z) and may be operable to determine its location based on a comparison of structures obtained from images captured by a camera in the wireless device 101 and known structures in a pre-stored or retrieved database.

The wireless device 101 may be operable to download a map, or structural database, comprising visible structures of the shopping mall 200 when the device enters the facility and loses satellite positioning signals. In another exemplary scenario, the wireless device 101 may download a structural database when the user of the wireless device 101 activates a positioning function on the device and no satellite positioning signals are present. In yet another exemplary scenario, the wireless device 101 may have structural maps stored internally for various buildings frequented by the user, or automatically downloaded whenever in the vicinity of a structure that attenuates satellite positioning signals.

In an exemplary scenario, once inside the shopping mall 200, the wireless device 101 may capture one or more images, or video, of the structures visible in the shopping mall 200. For example, the wireless device 101 may be used to scan from left to right, as illustrated by the curved arrow in FIG. 2A, capturing an image comprising the store entrance 201, the lamppost 203, the kiosk 205, the support column 207, the corners 209A and 209B, the fountain 211, and the bench 213. The captured image or images and their orientation to structural elements may be compared to the known structures in the shopping mall 200 from a pre-stored or downloaded structural database.

The database may comprise basic elements such as the name and 3D location of the structural element; images or abstractions of the image of the structural element to allow for easy identification from any orientation relative to the element (including things like color of the element, and nearby structural elements). Given images containing several possible structural elements, their orientation and distance, the wireless device 101 may find in the database the most likely structural elements that correspond to those in the images. Feature extraction from image abstraction may be performed by the wireless device and/or by the system comprising the database.

The wireless device 101 may then compare the captured image to a database comprising the known structures. For example, a processor in the wireless device 101 may determine a coarse location by determining that the image of the fountain 211 as captured closely matches the stored database image or outline of the fountain 211. In addition, given the known optical properties of the camera in the wireless device, e.g., focal length and zoom, and the size of the fountain 211 from the database, the wireless device 101 may thus calculate its distance from the fountain 211.

The wireless device may then obtain a more precise location by determining that the since the image captured shows the kiosk 205 to the left of the fountain 211 and the bench 213 partially in front of it, in conjunction with the determined distance from the fountain, the wireless device 101 is at position (x,y,z).

In an exemplary scenario, the wireless device 101 may then display a map for the user to navigate to a desired location, such as an emergency exit, restroom, or other desired location in the shopping mall 200, for example. The wireless device 101 may then calculate its location on a constant or periodic basis, assuming the camera continues to take images as the user travels throughout the shopping mall 200. It should be noted that the invention is not limited to location determination in a shopping mall, but may be utilized in any location where GNSS positioning is not available and a database of known structural characteristics is available. For example, this may include sports arenas, train stations, airports, hospitals, or office buildings. Using the time elapsed between images, together with the estimated distances from structural elements, velocity (speed and direction) can be estimated, which acts as another input to the inertial guidance system in the wireless device 101, which may comprise a compass and inertial sensors, for example.

In another exemplary scenario, the wireless device 101 may be operable to capture images of store signs or other text visible in the shopping center 220 and determine its location based on the known location of stores or other sources of text in the stored database.

Figure 2B:
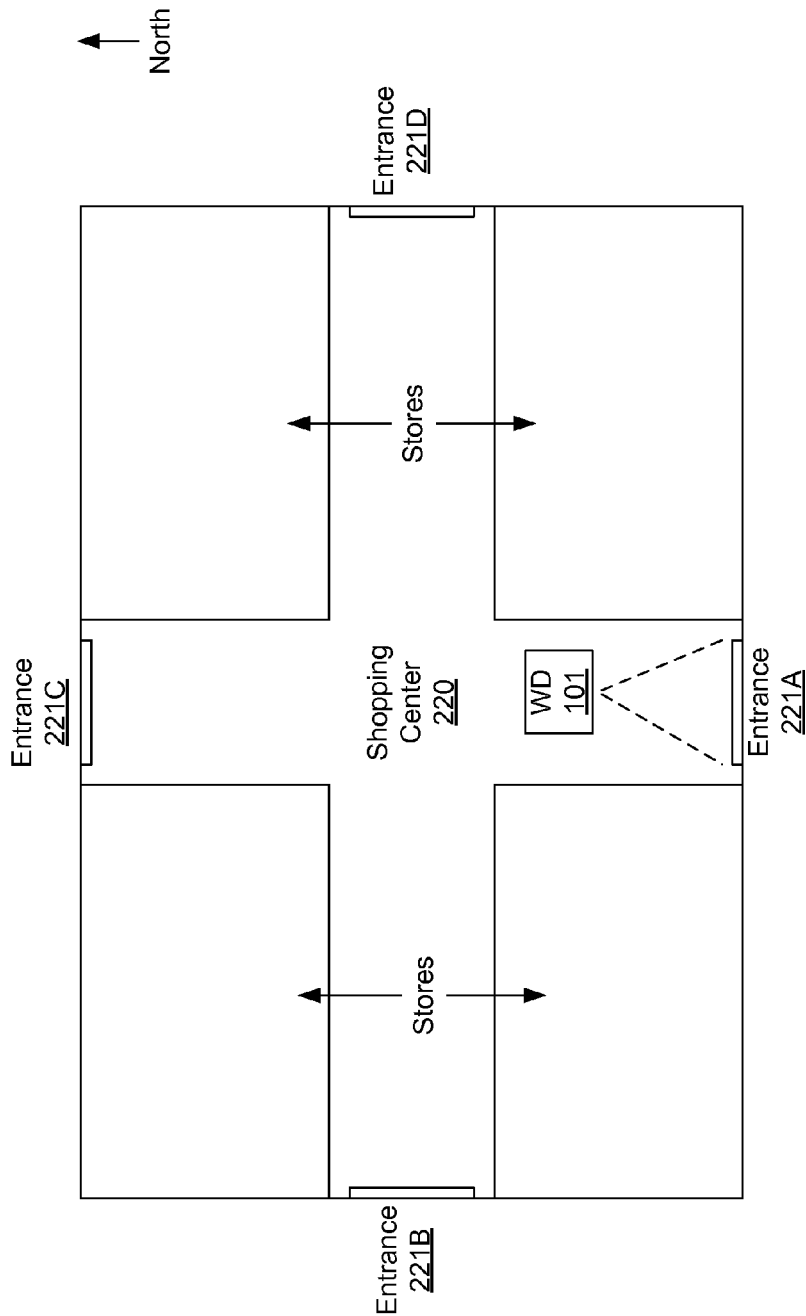
FIG. 2B a diagram illustrating an exemplary wireless device positioning performed inside a structure based on entrances to the structure, in accordance with an embodiment of the invention.

FIG. 2B is a diagram illustrating an exemplary wireless device positioning performed inside a structure based on entrances to the structure, in accordance with an embodiment of the invention. Referring to FIG. 2B, there is shown a shopping center 220 with various stores, the wireless device 101, and entrances 221A-221D.

In an exemplary scenario, the wireless device 101 may be operable to determine an initial position inside the shopping center 220 by determining the GNSS location of the device at a particular entrance, such as entrance 221A for example. In other words, the device knows that it has entered the shopping center 220 at entrance 221A, since, for example, the structural database for the shopping center 220 includes GNSS positions for each entrance to the building. This will enable the wireless device 101 to obtain an initial position for navigation within the shopping center 220 without the use of GNSS, in accordance with the structural database for the shopping center 220, as described herein.

In another exemplary scenario, the wireless device 101 may be operable to determine its initial position within the shopping center 220 without GNSS. The wireless device may have lost GNSS reception when it entered the shopping center 220, or may have had GNSS recently switched off or disabled, for example.

The wireless device 101 may be operable to determine its location through the identification of the nearest entrance. For example, the wireless device 101 may comprise a compass such that it can determine what direction the wireless device 101 is facing when capturing an image of an entrance, such as the entrance 221A. The locations and directional facings of the entrances 221A-221D of the shopping center 220 may be known, i.e., stored in a structural database. Thus, initial position can be determined by comparison of the captured image of the entrance with the direction of the device 101 when the image was captured, with the corresponding information stored in the structural database (i.e., with information representative of each entrance and what direction each entrance is facing). In the non-limiting example shown in FIG. 2B, since the database indicates that the shopping center 220 comprises a single south facing entrance (i.e. entrance 221A), the wireless device 101 may then determine its position by calculating a distance from the entrance 221A using the captured image. In addition, if more than one entrance were to be located to the south, other structural features in the captured image may be utilized to narrow the location down to be near one particular entrance.

In another exemplary scenario, there may not yet be a fully developed structural or textual database for the shopping center 220. The wireless device may thus be utilized to input data to a structural database for the shopping center 220. For example, the wireless device 101 may have established its position before entering the shopping center 220 and then acquired images and/or video of the structures once inside. Similarly, the wireless device 101 may obtain spatial data in conjunction with captured images and/or video utilizing a pedometer and an altimeter (if necessary), or may capture textual data to be input into to the database.

Figure 2C:
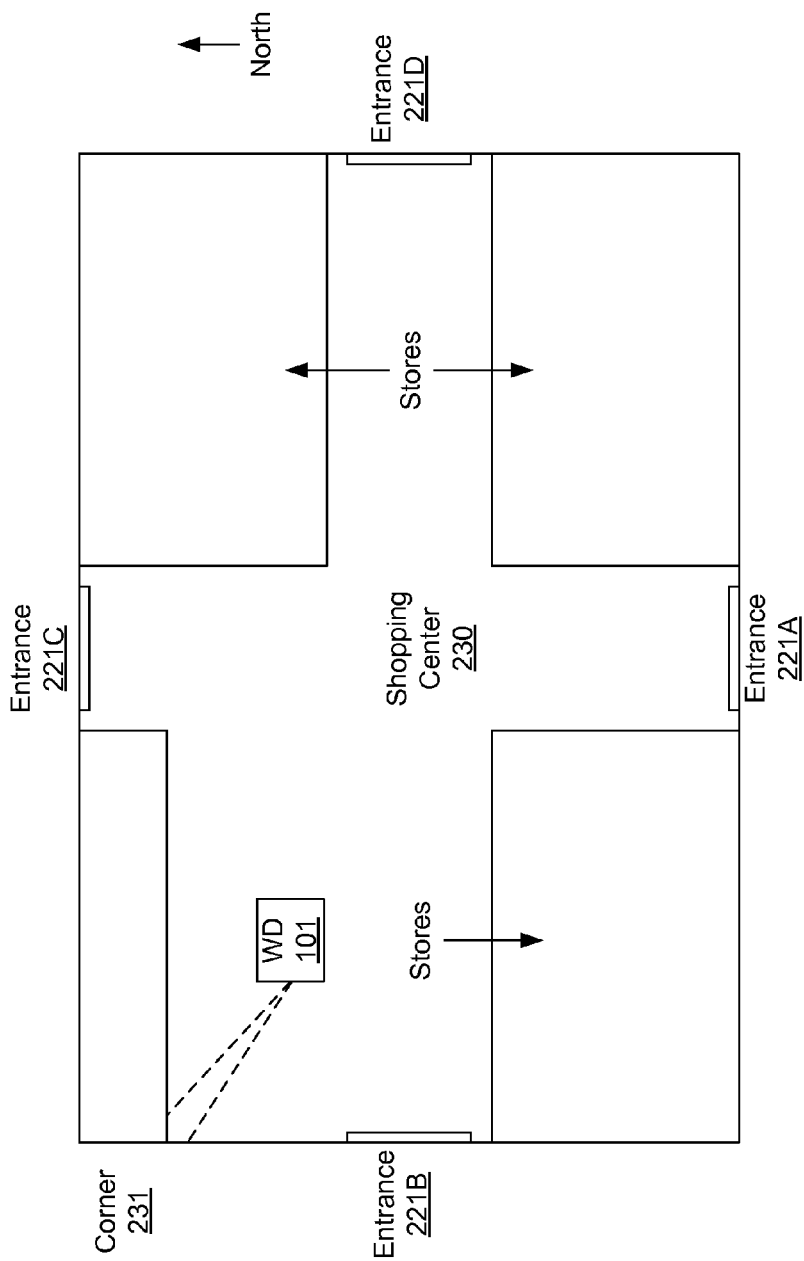
FIG. 2C is a diagram illustrating an exemplary wireless device positioning performed inside a structure based on corners of the structure, in accordance with an embodiment of the invention.

FIG. 2C is a diagram illustrating an exemplary wireless device positioning performed inside a structure based on corners of the structure, in accordance with an embodiment of the invention. Referring to FIG. 2C, there is shown a shopping center 230 with various stores, the wireless device 101, entrances 221A-221D, and a corner 231.

In an exemplary scenario, the wireless device 101 may be operable to determine its position within the shopping center 230 without the use of GNSS. For example, the wireless device 101 may comprise a compass such that it can determine what direction the wireless device 101 is facing when capturing an image of a corner of the building, such as the corner 231. The corner 231 may comprise a known location in a stored structural database such that the wireless device 101 may then determine its position by calculating its distance from the corner 231. This distance may be calculated from the captured image based on the known optical characteristics of the camera in the wireless device 101, for example.

In the exemplary scenario in shown in FIG. 2C, the wireless device 101 captures an image of the corner, and determines that the wireless device 101 is facing northwest during the capture. This information is compared to corresponding information in the structural database (i.e., each corner and what direction each corner is "pointing"). A determination is then made that the device is facing a corner and that the device is pointing northwest. Accordingly, the northwest corner, or corner 231, is identified as an initial position. A more accurate determination of position may then be determined by calculation of the distance of the device 101 from the corner 231, as described herein.

Figure 2D:
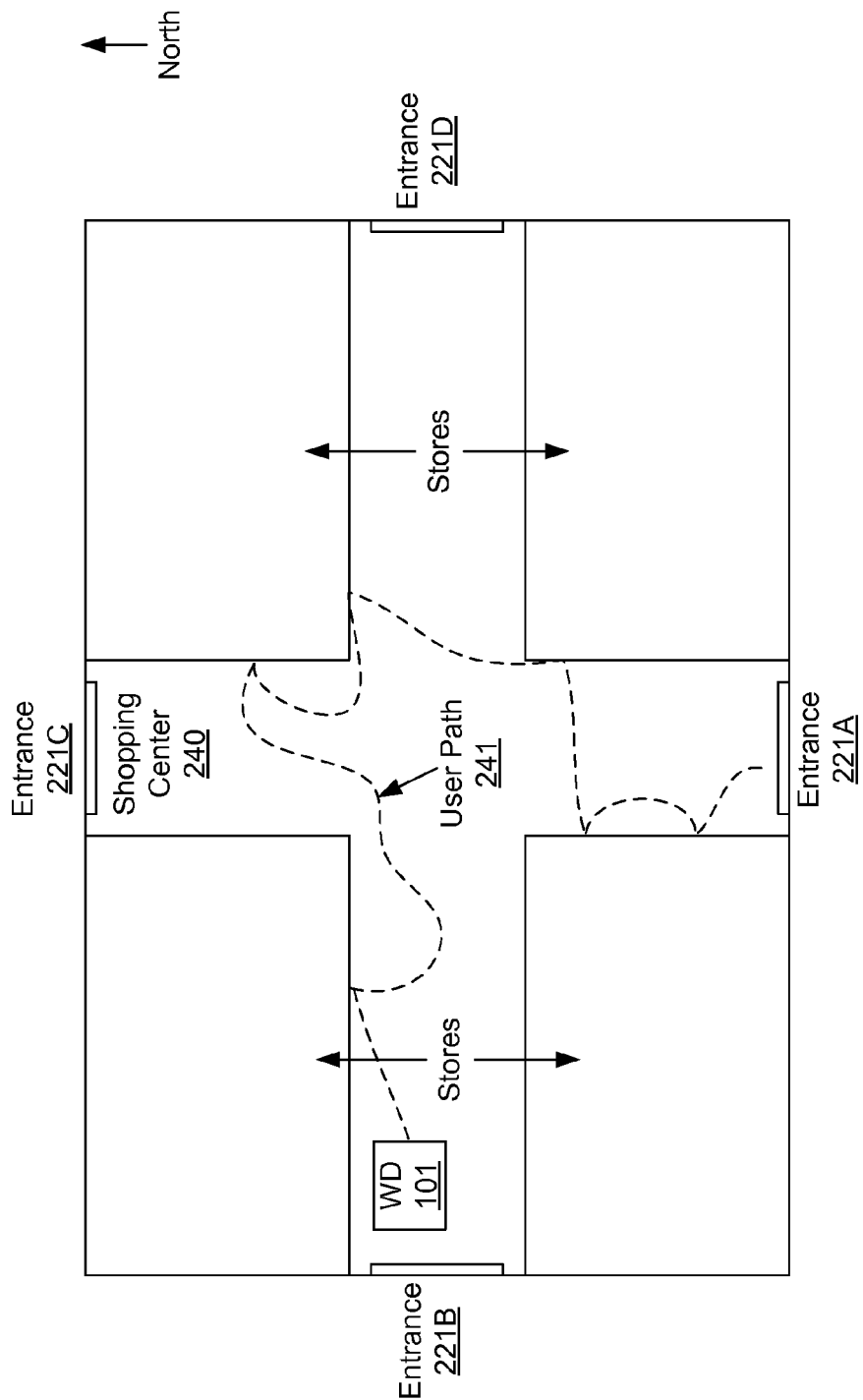
FIG. 2D is a diagram illustrating an exemplary wireless device positioning performed inside a structure based on a user's path inside the structure, in accordance with an embodiment of the invention.

FIG. 2D is a diagram illustrating an exemplary wireless device positioning performed inside a structure based on a user's path inside the structure, in accordance with an embodiment of the invention. Referring to FIG. 2D, there is shown a shopping center 240 with various stores, the wireless device 101, entrances 221A-221D, and a user path 241.

In an exemplary scenario, the wireless device 101 may be operable to determine its position within the shopping center 230 without GNSS. For example, the wireless device 101 may comprise a compass such that it can determine what direction the wireless device 101 is facing and may also comprise a pedometer for determining the distance the user of the wireless device 101 has traveled based on the number of steps taken since the last GNSS position was determined. The wireless device 101 may determine its position by calculating a distance traveled using a pedometer and an altimeter, if necessary (i.e., if the user has traveled to a different level or floor of the shopping center 230), in conjunction with the direction traveled as determined by a compass. The distance from the last known GNSS position may be determined by integrating the steps taken over the direction that the wireless device 101 traveled as determined by a compass, for example.

In another exemplary scenario, the wireless device 101 may be operable to track its position via captured images and/or video. For example, images may be taken periodically such that the wireless device 101 may update its position by calculating its distance from captured images as compared to a structural database.

Figure 2E:
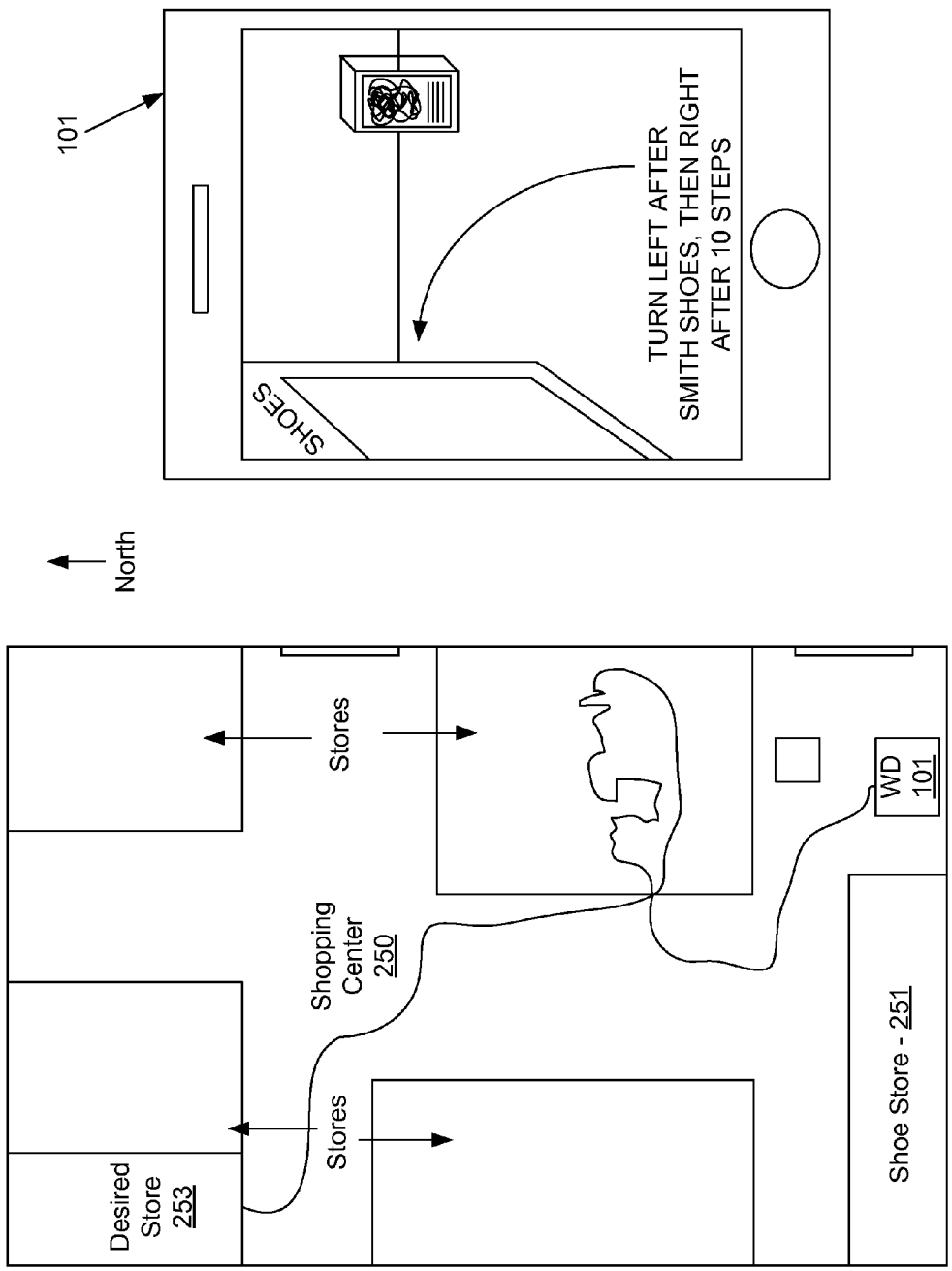
FIG. 2E is a diagram illustrating an exemplary wireless device navigation, in accordance with an embodiment of the invention.

FIG. 2E is a diagram illustrating an exemplary wireless device navigation, in accordance with an embodiment of the invention. Referring to FIG. 2E, there is shown a shopping center 250, the wireless device 101, various stores, a shoe store 251, and a desired store 253.

In an exemplary scenario, the wireless device 101 may be operable to determine its position, and then may be able to navigate the user of the wireless device 101 to a desired location, such as at the desired store 253 from its present position near the shoe store 251, all without GNSS.

The wireless device 101 may determine its initial or present position from an image of a nearby entrance, the text of a nearby store sign, or any other structure in the vicinity of the device that corresponds to items in a stored structural database or map, as discussed above. The user of the device may then enter a desired location or destination, such as the desired store 253, into the wireless device 101 via textual or audio inputs, for example.

The wireless device 101 may also be operable to determine the optimal path to reach the desired store 253, based on the stored map of the shopping center 250, and may display all or part of a map demonstrating the steps to be taken by the user to get to the destination. For example, the wireless device 101 may display a top-view surface map of the shopping center 250, and overlay a path or direction on the map for the user to follow, with instructions and/or arrows for navigation assistance. Alternatively (or additionally), the wireless device 101 may display a superimposed augmented reality, with instructions, arrows, and/or a direction overlaid on an image of the shopping center 250 in the direction in which the user should be facing to reach the desired destination. The wireless device 101 may then, using the compass and pedometer (and altimeter, if necessary), track and display the user's progress along the path to, or in the direction toward, the desired destination.

In addition, the wireless device 101 may utilize structural features from captured images to track the progress of the user toward the desired store 253. The updated positioning may enable an updated augmented reality display, such that the displayed image continues to match that of the surroundings when following the appropriate route.

In instances where the wireless device 101 is no longer capable of capturing images, such as by being placed in a pocket, it may continue to track position via a pedometer, compass, and/or an altimeter, such that when the wireless device 101 is again retrieved to check the route, it may still have an accurate calculated position. The wireless device 101 may reestablish its position using a captured image to verify its location with respect to the desired destination.

Similarly, if the user of the wireless device 101 makes a stop along the way, as shown in FIG. 2, the wireless device 101 may again establish a route by determining its position without the use of GNSS, and comparing the determined position to that of the desired store 253 in the stored map. This position may be reestablished by capturing an image of the exited storefront or other structures in the vicinity, for example, as described herein. This information can then be used to assist the user, via the map or superimposed augmented reality, back on the previous path or in the proper direction, or on a new path or in a new direction, to the desired destination (i.e., desired store 253).

Figure 3:
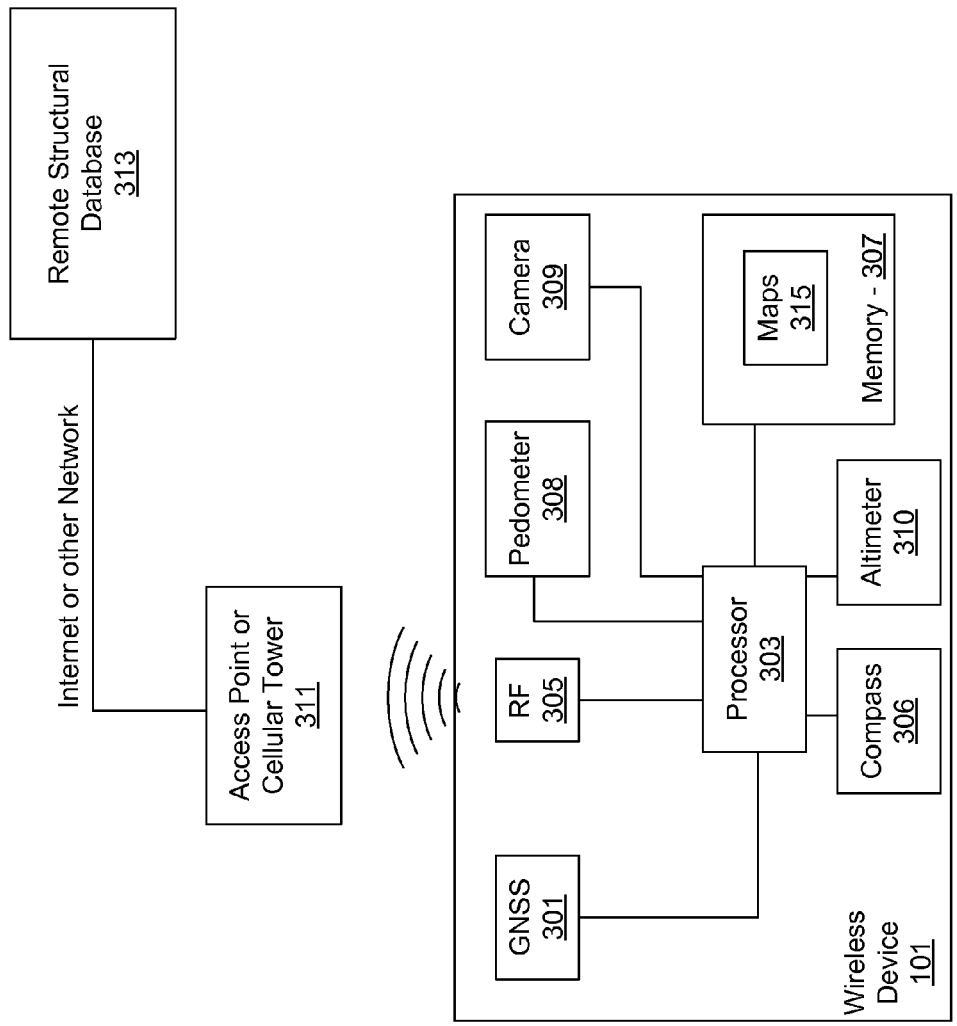
FIG. 3 is a diagram illustrating an exemplary wireless device for positioning, in accordance with an embodiment of the invention.

FIG. 3 is a block diagram illustrating an exemplary positioning wireless device, in accordance with an embodiment of the invention. Referring to FIG. 3, there is shown the wireless device 101 comprising a global navigation satellite system (GNSS) module 301, a processor 303, an RF module 305, a memory 307, and a camera 309. There are also shown the access point or cellular tower 311 and the remote structural database 313.

The GNSS module 301 may comprise an RF receiver (Rx) path for receiving satellite signals for positioning functions. The GNSS module 301 may be operable to down-convert received RF signals to baseband and subsequently demodulate the baseband signals to obtain an accurate clock signal, such as a GPS clock signal. By receiving clock signals and ephemeris data from multiple satellites, the wireless device 101 may be operable to accurately determine its location.

The RF module 305 may comprise one or more RF Rx and transmit (Tx) paths for communicating with cellular towers or wireless access points, for example. The RF module 305 may comprise one or more antennas, low-noise amplifiers (LNAs), power amplifiers, mixers, local oscillators, variable gain amplifiers, filters, and analog-to-digital converters (ADCs), for example. The RF module may thus be operable to receive RF signals, amplify the signals before down-converting to baseband, filter out noise signals, and convert the resulting filtered signals to digital signals for processing by the processor 303. Similarly, the RF module may be operable to convert digital baseband signals to analog signals, upconvert the analog baseband signals to RF, amplify the resulting RF signals and transmit the amplified signals via an antenna.

The memory 307 may comprise a programmable memory module that may be operable to store software and data, for example, for the operation of the wireless device 101. Furthermore, the memory 307 may store downloaded structural databases that may be utilized by the processor 303 to determine its location without a GNSS signal.

The camera 309 may be operable to capture still and/or video images via a charge-coupled device (CCD) or complementary metal-oxide semiconductor (CMOS) imaging sensor and associated optical components, such as lenses and readout circuitry. The optical components may comprise one or more lenses with known focal lengths for determining the distance to an object that is in focus, for example.

The processor 303 may comprise a general purpose processor, such as a reduced instruction set computing (RISC) processor, for example, that may be operable to control the functions of the wireless device. For example, the processor 303 may enable the GNSS module 301 when a user indicates a desire to determine their location. Similarly, the processor may utilize images captured by the camera 309 to determine location when no GNSS signal is present. The processor may correlate a previously determined GNSS location to a stored or downloaded structural map of a building or other structure that the user of the wireless device 101 has entered.

The access point or cellular tower 311 may be operable to provide wireless connectivity to the wireless device 101 via the RF module 305. The access point or cellular tower 311 may enable access to the remote structural database 313 via the Internet or other network.

The remote structural database 313 may comprise data relating to structural features of a building or other location where GNSS signals are not available. For example, the remote structural database 313 may comprise images of the structure of the building, or may comprise a wireframe model of the buildings. The wireless device 101 may download data from the remote structural database 313 when entering a building or may download such data at some time prior to entering.

Figure 4:
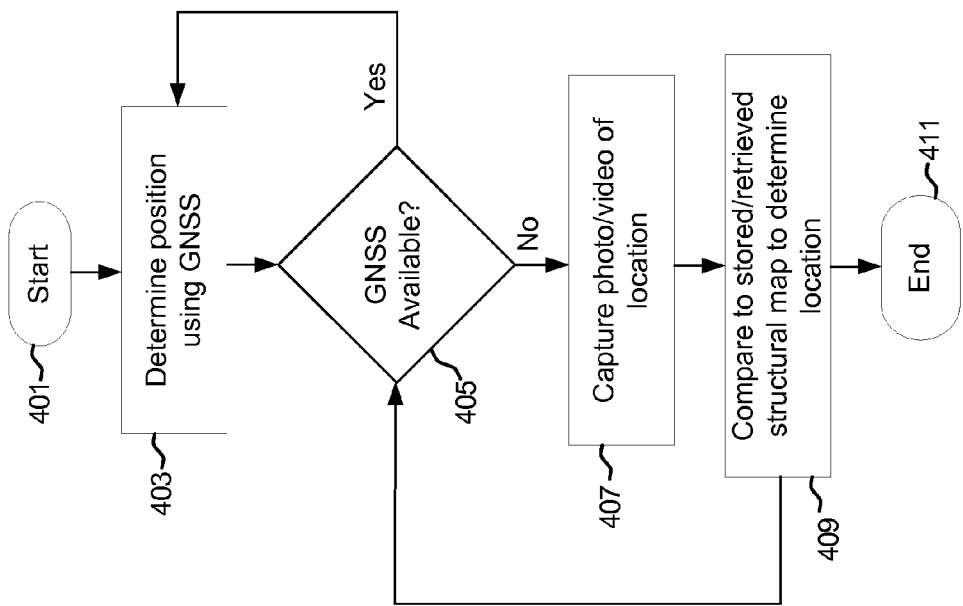
FIG. 4 is a block diagram illustrating exemplary steps in determining location without GNSS, in accordance with an embodiment of the invention.

FIG. 4 is a block diagram illustrating exemplary steps in determining location without GNSS, in accordance with an embodiment of the invention. The exemplary method illustrated in FIG. 4 may, for example, share any or all functional aspects discussed previously with regard to FIGS. 1-3. Referring to FIG. 4, after start step 401, in step 403, the wireless device may determine its location via GNSS (e.g., GPS).

In step 405, if GNSS signals are still available for positioning purposes, the exemplary steps may return to step 403 for continued GNSS positioning. If there are no GNSS signals, such as when the wireless device enters a building or other facility that attenuates GNSS signals below a threshold required for positioning purposes, the wireless device may take one or more photo images or videos of the structural features of the surroundings. For example, this may include columns, archways, kiosks, fountains, hallways, etc.

In step 407, the wireless device may compare the structures in the captured images to a stored and/or retrieved structural database. For example, the wireless device may take an image of a doorway that matches that of a doorway stored in a structural database in the wireless device, which may then calculate an accurate position based on the distance from the known structure, as determined by the image size. The optical properties of the camera system in the wireless device may assist in determining an accurate location by determining a distance to an imaged structure.

The structural map may be pre-stored in the wireless device, or may be downloaded at the time of entry into the building. For example, if a calendar in a wireless device indicates that the user will be at a sports event at a particular time, the wireless device may download a structural map for the sports arena prior to arrival at the event. In another exemplary scenario, the wireless device may download a structural map for the nearest structure as determined by the last GNSS determined position when GNSS signals were lost.

The exemplary steps may end at end step 411, or may continue back to step 405 if further positioning is desired.

Figure 5:
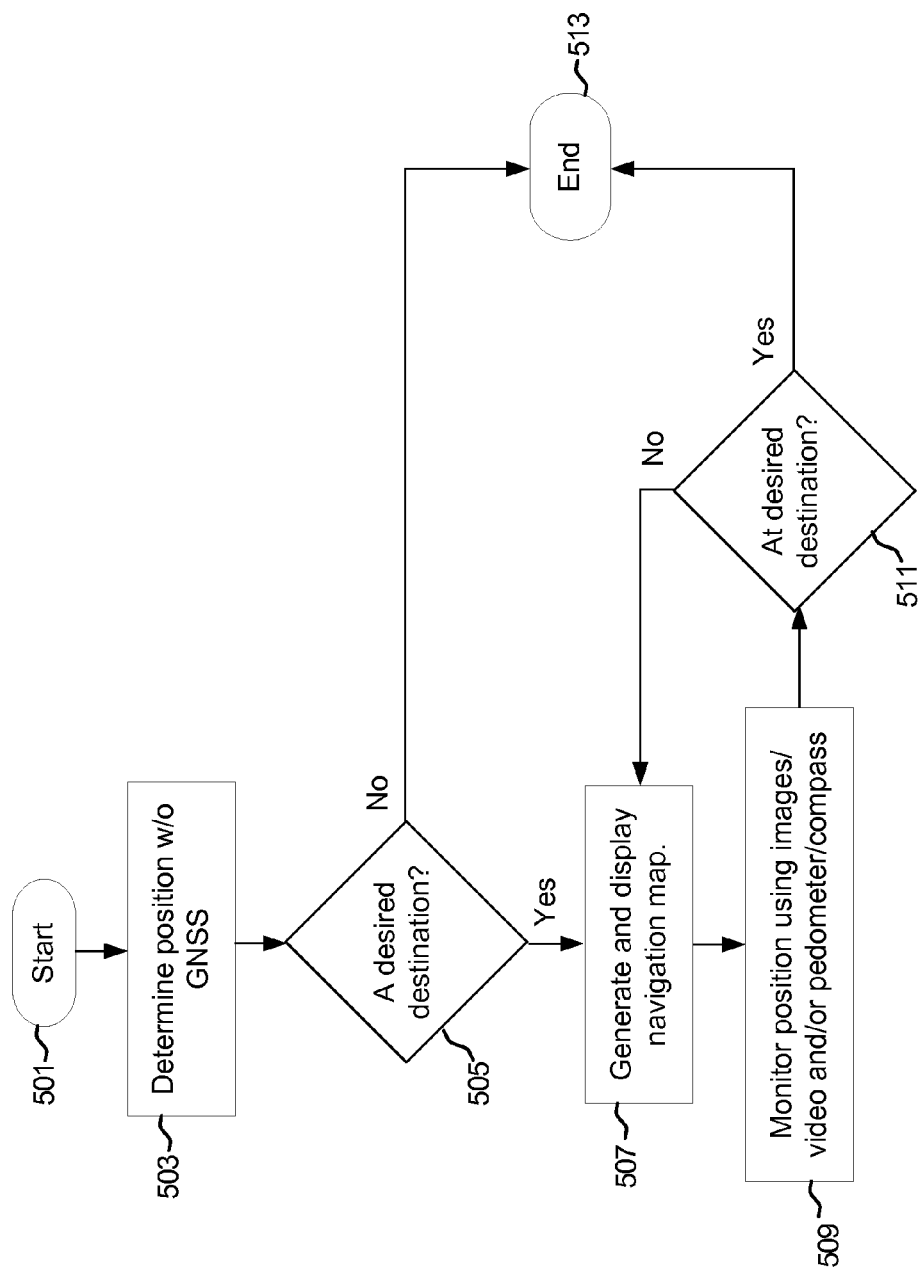
FIG. 5 is a block diagram illustrating exemplary steps for navigation without GNSS, in accordance with an embodiment of the invention.

FIG. 5 is a block diagram illustrating exemplary steps for navigation without GNSS, in accordance with an embodiment of the invention. The exemplary method illustrated in FIG. 5 may, for example, share any or all functional aspects discussed previously with regard to FIGS. 1-4. Referring to FIG. 5, after start step 501, in step 503, the wireless device may determine its location without GNSS, but with knowledge that it is within a particular structure, such as a shopping center or sports arena, for example. The position may be determined by measuring a distance to a structure whose location is stored in a structural database. The wireless device may take one or more photo images or videos of the structural features of the surroundings. For example, this may include entrances, doors, corners, columns, archways, kiosks, fountains, hallways, escalators, elevators, etc. Knowledge of the optical properties of the camera system in the wireless device may assist in determining an accurate location by determining a distance to an imaged structure.

In step 505, if the user of the wireless device has entered a desired destination either textually or vocally, the exemplary steps may proceed to step 507, and if there is no desired destination, the exemplary steps may proceed to end step 513.

In step 507, the wireless device may generate and display a navigation map comprising a top-view surface map with a path or direction overlaid thereon, or an augmented reality with a path or direction overlaid on an image of the surroundings in the direction of the desired location.

In step 509, the position of the wireless device may be tracked or monitored utilizing periodically captured images and/or video, and/or by tracking distance utilizing a pedometer in conjunction with a compass (and altimeter, if necessary). In this regard, the wireless device may track and display the user's progress along the path to, or in the direction toward, the desired destination. In step, 511, if the wireless device is at the desired location, the exemplary steps may proceed to end step 513, and if not may continue back to step 507 for further navigation.

Figure 6:
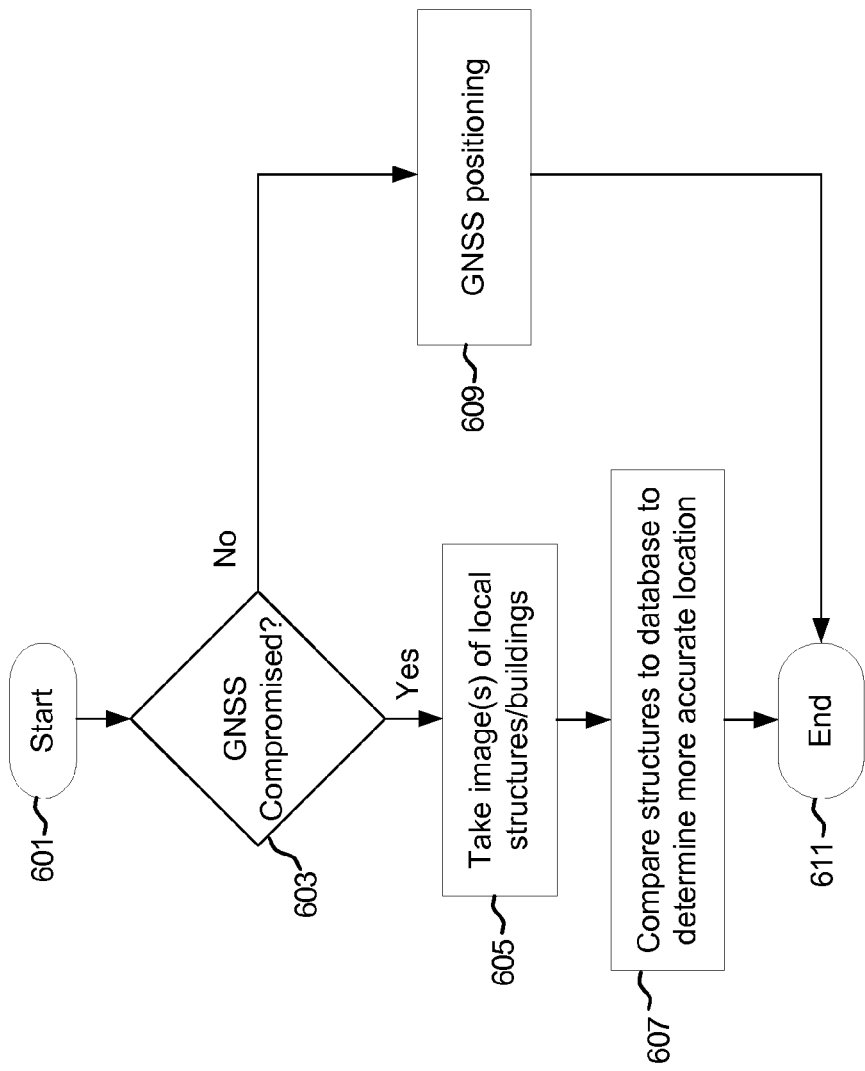
FIG. 6 is a flow diagram illustrating exemplary steps in an enhanced GNSS positioning, in accordance with an embodiment of the invention.

FIG. 6 is a flow diagram illustrating an exemplary steps in an enhanced GNSS positioning, in accordance with an embodiment of the invention. The exemplary method illustrated in FIG. 6 may, for example, share any or all functional aspects discussed previously with regard to FIGS. 1-5. Referring to FIG. 6, after start step 601, in step 603, if the GNSS signal is weak or minimal satellites are within the field of view due to the wireless device being surrounded by tall buildings or other attenuating structures, the exemplary steps may proceed to step 605 where the wireless device may take one or more images or vide of the surrounding structures. If the GNSS signal is strong, and thus the accuracy of the positioning is high, the exemplary steps may proceed to step 609 for further GNSS positioning followed by end step 611.

In step 607, the structures in the captured images or video may be compared to structures in a database to determine a more accurate location. For example, if GNSS has determined that the wireless device is on a particular street with about 100 meter accuracy, the wireless device may take images of one or more nearby buildings. The buildings may be stored in the database, enabling the wireless device to accurately determine its location, despite the weak GNSS signal, followed by end step 611.

Figure 7:
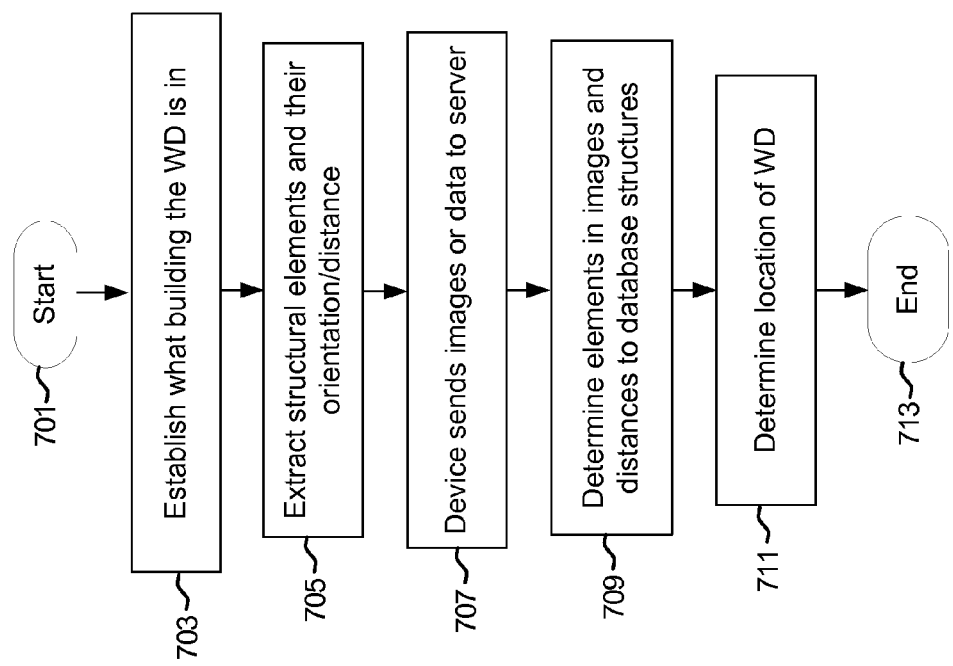
FIG. 7 is a flow diagram illustrating exemplary steps in image structural element extraction, in accordance with an embodiment of the invention.

FIG. 7 is a flow diagram illustrating exemplary steps in image structural element extraction, in accordance with an embodiment of the invention. The exemplary method illustrated in FIG. 7 may, for example, share any or all functional aspects discussed previously with regard to FIGS. 1-6. Referring to FIG. 7, after start step 701, in step 703, the wireless device may determine what building or other attenuating structure that it is within based on its last known position and, if available, velocity and/or elapsed time. In step 705, image processing algorithms may be utilized to extract key structural elements of the building and the wireless device may establish the orientations and distances of the extracted elements.

In step 707, the wireless device may communicate images and/or the extracted structural elements, orientations, and distances to a server comprising one or more structural databases, followed by step 709, where the server may determine which structural elements are in the image by comparing the characteristics of the elements and the relative positions of the elements with elements stored in the database. The characteristics may comprise color, texture, patterns, or other visible features of the captured elements, for example.

In step 711, the server, or alternatively the wireless device, may use triangulation and/or trilateration to establish the location of the wireless device, followed by end step 713.

Figure 8:
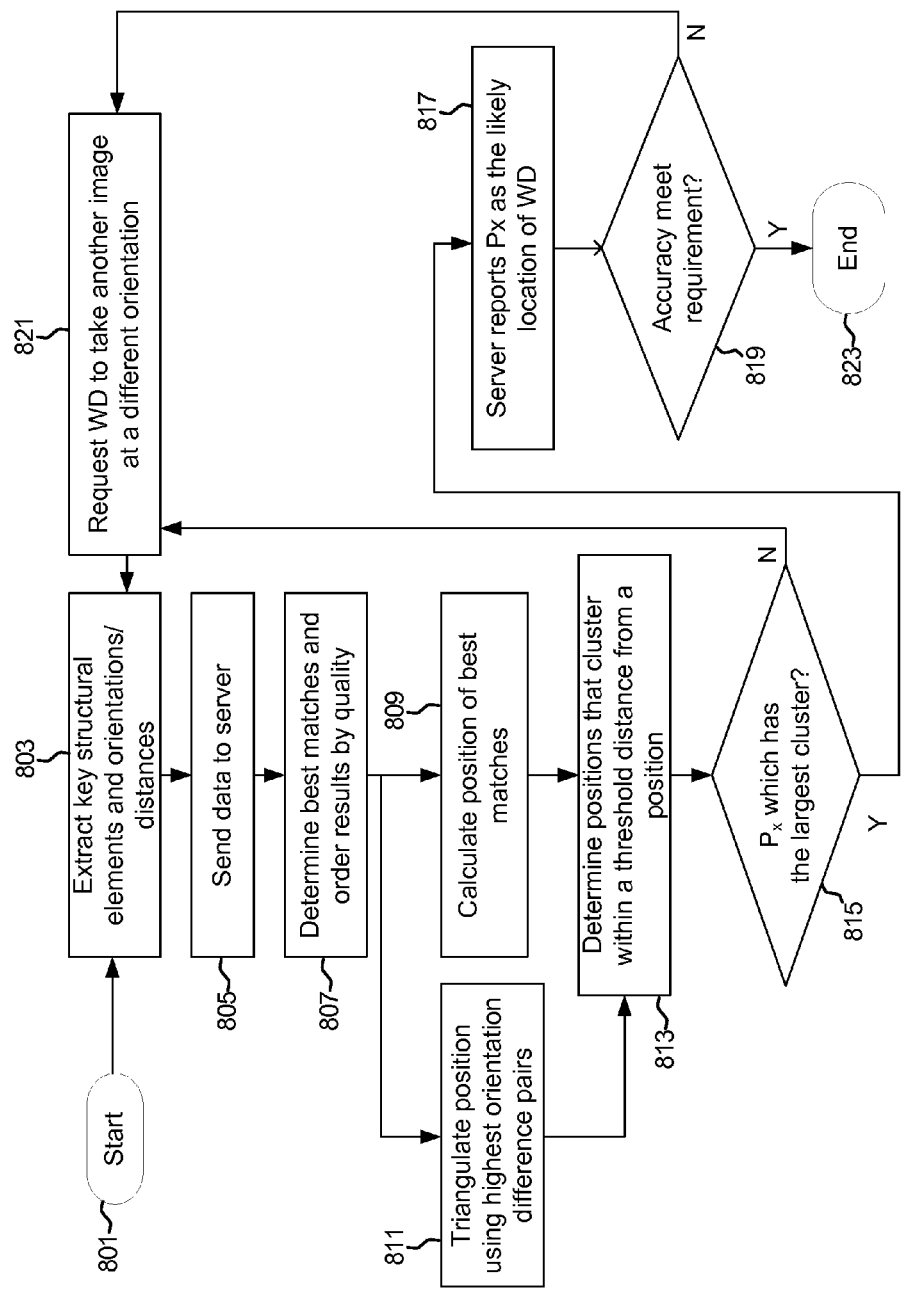
FIG. 8 is a flow diagram illustrating exemplary steps for accurate wireless device positioning, in accordance with an embodiment of the invention.

FIG. 8 is a flow diagram illustrating exemplary steps for accurate wireless device positioning, in accordance with an embodiment of the invention. The exemplary method illustrated in FIG. 8 may, for example, share any or all functional aspects discussed previously with regard to FIGS. 1-8. Referring to FIG. 8, after start step 801, in step 803, image processing algorithms may be utilized to extract key structural elements from one or more images or videos captured of a building or other attenuating structure by the wireless device. The wireless device may establish orientations and distances of the elements with respect to the wireless device.

In step 805, the wireless device may communicate extracted features, orientations, and distances of the elements to a server comprising one or more structural databases. In step 807, the server may determine the best matches between received data and structural elements within its database, and may order the results by the quality, $Q_i$, of the match.

Following step 807, the exemplary steps may include one or both of steps 809 and 811. In step 809, the server may start with the highest quality matches, $M_i$, and use the orientation and distance to the wireless device to determine the estimated position of the wireless device, $P_i$. In step 811, the server may start with the highest quality match pairs, $M_i$ and $M_j$ that have the largest orientation difference, and use them to triangulate the position $P_{ij}$.

In step 813, the server may find the matches $M_j$ that have positions $P_i$ and $P_{ij}$ that cluster most closely around a position $P_x$, using a distance metric weighted by the quality of match and triangulation. In step, 815, if there is a $P_x$ which has the largest cluster, including data from previous iterations, the exemplary steps may proceed to step 817, where the server may report $P_x$ as the likely location of the wireless device. The accuracy may be given by the variance of the positions $P_j$ weighted by the quality of the match and triangulation.

If, in step 815, there is no $P_x$ with a large cluster of results, the exemplary steps may proceed to step 821 where the wireless device may be requested to take one or more images at a different orientation, preferably recommending an orientation with a prominent structural element and large orientation difference, before proceeding to step 803 for a renewed extraction process.

Following step 817, in step 819, if the positioning accuracy meets a user or application requirement, the exemplary steps may proceed to end step 823, and if not, the exemplary steps may proceed to step 821 for further image capture.

In an embodiment of the invention, a method and system may comprise receiving global navigation satellite system (GNSS) signals in a wireless communication device for determining a first position of the wireless communication device. One or more images of structures in the vicinity of the wireless communication device may be captured and a position of the wireless communication device may be determined by comparing structures in the one or more captured one or more images to structures in a stored database of structures. GNSS signals may be received when GNSS signals sufficient for positioning are present.

An orientation of structures in the captured one or more images may be sensed relative to the wireless device 101. Images may be processed for feature extraction and identification of structural elements for the position determining. An orientation of the wireless device 101 may be utilized in conjunction with the extraction and identification for the position determining. The orientation and extraction and identification may be utilized in conjunction with determined distances from one or more identified structures for the position determining. The locations of structures and/or the captured one or more images may be stored in the database of structures.

The database of structures may be pre-stored and may be pre-stored based on a known future location of a user of the wireless communication device. The database of structures may be downloaded and stored when GNSS signals sufficient for positioning are no longer received by the wireless communication device. The database of structures may comprise a plurality of images. The one or more images may comprise a video of structures in the vicinity of the wireless communication device.

A distance from one or more of the structures in the vicinity of the wireless communication device may be determined based on known optical properties of a camera in the wireless communication device, where the optical properties may comprise zoom and focal length, as is done with range-finding scopes and binoculars. The determined distance may be used to determine an accurate location based on the captured one or more images. The first location of the wireless device may be determined utilizing medium Earth orbit satellite signals and/or low Earth orbit satellite signals.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for location determination using structural visual information.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless device positioning, the method comprising:
   in a wireless communication device:
      capturing one or more images of one or more structures a vicinity of said wireless communication device;
      extracting structural element data from the captured images;
      determining best matches between extracted structural element data and structural data stored in memory;
      determining estimated positions $P_i$ of the best matches ordered by a quality $Q_i$ of the matches; and
      determining a position $P_x$ of said wireless communication device from a location that has a highest number of estimated positions $P_i$ of said wireless communication device clustered about it within a threshold distance, and if no position $P_x$ has estimated positions $P_i$ of said wireless communication device clustered within said threshold distance, capturing one or more additional images at a different orientation.

2. The method according to claim 1, comprising sensing an orientation of structures in said captured one or more images relative to said wireless communication device.

3. The method according to claim 1, comprising processing images for feature extraction and identification of structural elements for said determined estimated positions $P_i$.

4. The method according to claim 3, comprising utilizing an orientation of said wireless communication device in conjunction with said extraction and identification for said determined estimated positions $P_i$.

5. The method according to claim 4, comprising utilizing said orientation and said extraction and identification in conjunction with determined distances from one or more identified structures for said determined estimated positions $P_i$.

6. The method according to claim 1, comprising storing locations of structures and/or said captured one or more images in said memory.

7. The method according to claim 1, comprising receiving an instruction to capture one or more images in a different orientation when said determined position $P_x$ does not meet an accuracy requirement.

8. The method according to claim 1, comprising pre-storing said structural data in said memory of said wireless communication device based on a known future location of a user of said wireless communication device.

9. The method according to claim 1, comprising downloading and storing said structural data in said memory of said wireless communication device when GNSS signals sufficient for positioning are no longer received by said wireless communication device.

10. The method according to claim 1, wherein said structural data stored in said memory comprises one or more of: a plurality of images, abstractions of images, and locations.

11. The method according to claim 1, wherein said one or more images comprises a video of structures in the vicinity of said wireless communication device.

12. The method according to claim 1, comprising determining a distance from one or more of said structures in the vicinity of said wireless communication device based on known optical properties of a camera in said wireless communication device.

13. The method according to claim 12, wherein said optical properties comprises focal length and/or focus setting.

14. The method according to claim 12, wherein said determined distance is used to determine an accurate location based on said captured one or more images.

15. The method according to claim 1, comprising determining a first location of said wireless communication device utilizing medium Earth orbit satellite signals and/or low Earth orbit satellite signals.

16. A system for wireless communication, the system comprising:
   one or more circuits for use in a wireless communication device, said one or more circuits being operable to:
      capture one or more images of one or more structures a vicinity of said wireless communication device;
      extract structural element data from said one or more images;
      determine best matches between extracted structural element data and structural data stored in memory;
      determine estimated positions $P_i$ of the best matches ordered by a quality $Q_i$ of the matches; and
      determine a position $P_x$ of said wireless communication device from a location that has a highest number of estimated positions $P_i$ of said wireless communication device clustered about it within a threshold distance, and if no position $P_x$ has estimated positions $P_i$ of said wireless communication device clustered within said threshold distance, capturing one or more additional images at a different orientation.

17. The system according to claim 16, wherein said one or more circuits are operable to sense an orientation of structures in said captured one or more images relative to said wireless communication device.

18. The system according to claim 16, wherein said one or more circuits are operable to process images for feature extraction and identification of structural elements for determining said estimated positions $P_i$.

19. The system according to claim 18, wherein said one or more circuits are operable to utilize an orientation of said wireless communication device in conjunction with said extraction and identification for determining said estimated positions $P_i$.

20. The system according to claim 19, wherein said one or more circuits are operable to utilize said orientation and said extraction and identification in conjunction with determined distances from one or more identified structures for determining said position.

21. The system according to claim 16, wherein said one or more circuits are operable to store locations of structures and/or said captured one or more images in said memory.

22. The system according to claim 16, wherein said one or more circuits are operable to receive an instruction to capture one or more images in a different orientation when said determined position $P_x$ does not meet an accuracy requirement.

23. The system according to claim 16, wherein said one or more circuits are operable to pre-store said structural data in said memory of said wireless communication device based on a known future location of a user of said wireless communication device.

24. The system according to claim 16, wherein said one or more circuits are operable to download and store said structural data in said memory of said wireless communication device when GNSS signals sufficient for positioning are no longer received by said wireless communication device.

25. The system according to claim 16, wherein said structural data stored in said memory of said wireless communication device comprises a plurality of images.

26. The system according to claim 25, wherein said one or more images comprises a video of structures in the vicinity of said wireless communication device.

27. The system according to claim 16, wherein said one or more circuits are operable to determine a distance from one or more of said structures in the vicinity of said wireless communication device based on known optical properties of a camera in said wireless communication device.

28. The system according to claim 27, wherein said optical properties comprises zoom and focal length.

29. The system according to claim 27, wherein said determined distance is used to determine an accurate location based on said captured one or more images.

30. A system for location determination, the system comprising:
one or more circuits for use in a wireless communication device, said one or more circuits being operable to:
receive global positioning satellite (GPS) signals for determining a first position of said wireless communication device;
capture one or more images of one or more structures in the vicinity of said wireless communication device when insufficient GPS signals are present for positioning; and
determine a second position of said wireless communication device by:
extracting structural element data from the one or more captured images;
determining best matches between the extracted data and structural data stored in memory;
determining estimated positions $P_i$ of the best matches ordered by a quality $Q_i$ of the matches; and
determining a position $P_x$ of said wireless communication device from a location that has a highest number of estimated positions $P_i$ of said wireless communication device clustered about it within a threshold distance, and if no position $P_x$ has estimated positions $P_i$ of said wireless communication device clustered within said threshold distance, capturing one or more additional images at a different orientation.

* * * * *